July 4, 1950   C. B. FULTON   2,513,636
TANK CONSTRUCTION

Filed Jan. 21, 1946   2 Sheets-Sheet 1

C. B. Fulton
INVENTOR.

BY
C. A. Knowles
ATTORNEYS.

July 4, 1950    C. B. FULTON    2,513,636
TANK CONSTRUCTION
Filed Jan. 21, 1946    2 Sheets-Sheet 2
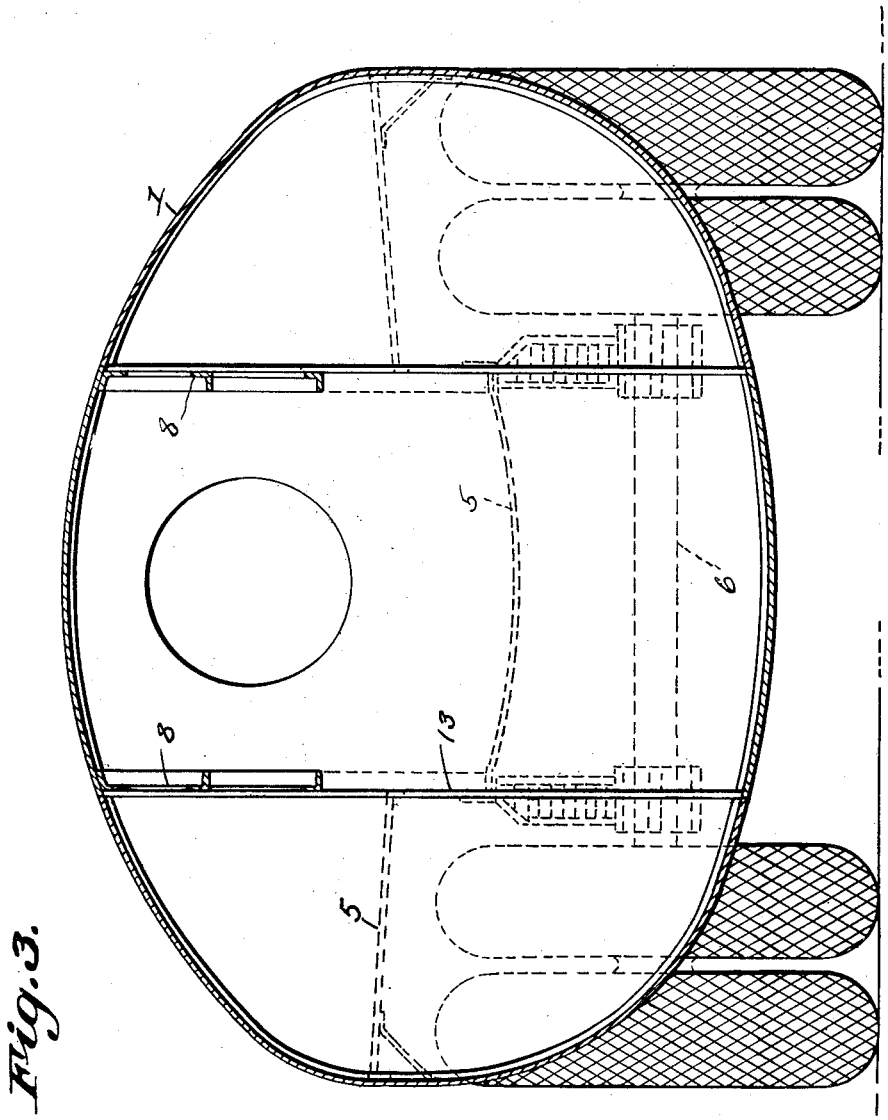
C. B. Fulton
INVENTOR.
BY
ATTORNEYS.

Patented July 4, 1950

2,513,636

UNITED STATES PATENT OFFICE 2,513,636

TANK CONSTRUCTION

Carroll B. Fulton, San Antonio, Tex.

Application January 21, 1946, Serial No. 642,530

1 Claim. (Cl. 280—5)

This invention relates to portable tanks such as are generally used in the transportation of liquids.

It is an object of the invention to suspend the tank from a longitudinal beam contained within the upper portion thereof, the size and proportions of the beam being in no way related to the depth or breadth of the tank provided the beam has the strength necessary to support the tank under all conditions.

A further object is to provide a tank having a lower center of gravity than heretofore has been possible, whereby danger of overturning during transport is minimized.

A still further object is to increase the capacity of the tank by extending a portion thereof below and between the center lines of the tank supporting axles, thereby to effect a tremendous gain in pay-load over a continued period of time.

Another object is to lighten the structure, thereby increasing the actual pay-load, this being an important consideration in the transportation of liquids, especially petroleum products, inasmuch as a few pounds saved in dead weight allows greater hauling capacity in spite of highway load limit restrictions.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings, the preferred form of the invention has been shown.

In said drawings:

Figure 3 is an enlarged section on the line 3—3, Figure 1.

Figure 1:
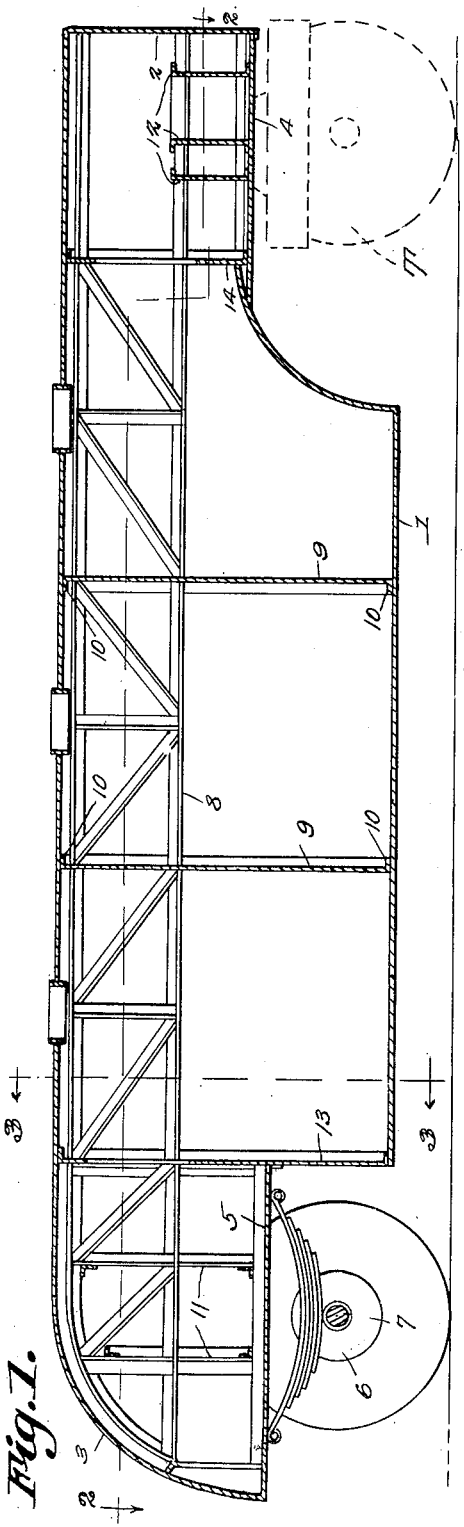
Figure 1 is a central vertical longitudinal section through a trailer tank construction in accordance with the present invention.
Figure 2:
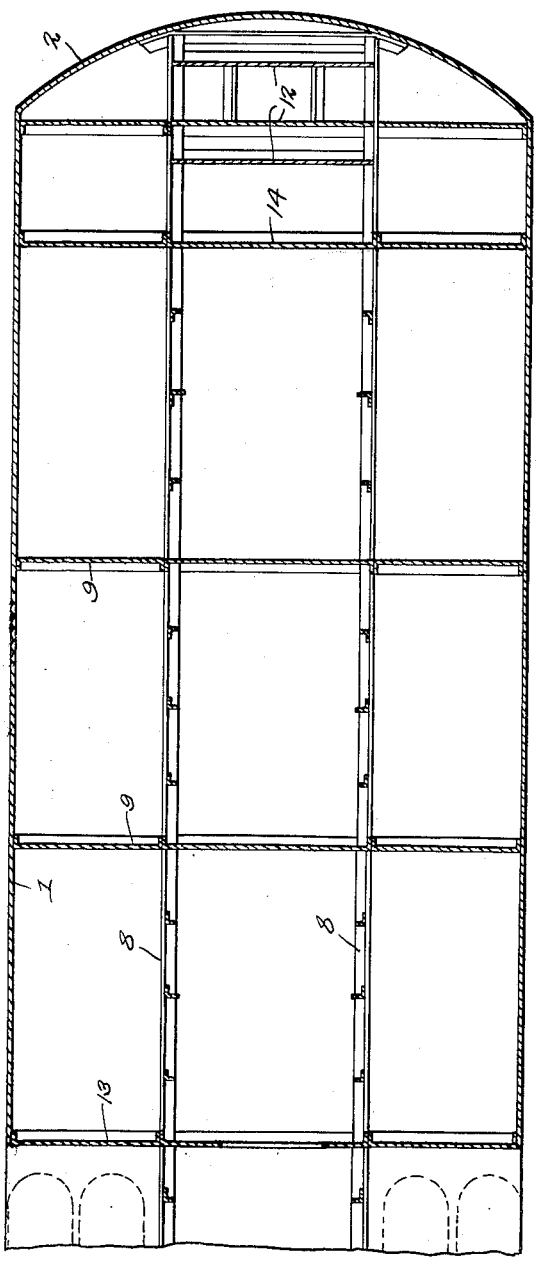
Figure 2 is an enlarged section through a portion thereof taken on the line 2—2, Figure 1.

While the present invention is applicable to various types of portable tanks used in the transportation of liquids, it has been deemed necessary, in the present instance, to illustrate only one form, namely, a trailer tank. In this structure the casing 1 of the tank, which is formed of a suitable sheet material, can be of the usual elliptical transverse contour except at its ends, where the shape can be modified to define a reduced front or prow portion 2 and a reduced rearwardly extending portion 3. Both of these portions are formed preferably with flat or curved bottoms 4 and 5, respectively, whereby the prow portion can overlie and be suitably connected to a tractor or other propelling means T indicated by broken lines, and the rear portion 5 can be fixedly mounted on a rear wheel supported structure 6.

The elliptical portion of the casing 1, which is the main part of the tank, is of such size as to extend well below the center lines of the axle 7 and the tractor wheels so that the capacity of the tank is thus materially increased as compared with those tanks which are of the same transverse contour throughout their lengths and have all portions located above the center lines of the supporting wheels. This arrangement also lowers the center of gravity so that the hazard of overturning while rounding curves or as the result of accidents, is reduced materially.

A most important feature of the present invention resides in the manner in which the tank is supported between its ends. Instead of mounting the tank on a cradle or building the tank about an interior structure connected both to the upper and lower portions of the tank, as has been the general practice, the present invention utilizes one or more beams 8 which can be solid beams or skeleton beams. Preferably, a skeleton beam such as shown in Figure 1 is employed because of its lightness and strength. The supporting beam or beams are located within the upper portion of the tank and extend throughout the length thereof so that the tank is, in effect, suspended therefrom. The reinforcing and supporting beam or beams are directly joined to the casing 1 of the tank solely along the top and at the extreme ends of the tank and the height of the beam as well as its width, bears no relation to the size of the suspended casing other than the necessity of utilizing a beam having requisite strength to carry the load.

The size and weight of this beam will depend upon the kind of metal used in its construction and in the type of construction where a beam in the form of a truss or fabricated skeleton is employed, great strength can be obtained with minimum weight. Under some conditions a single beam could be employed although in the structure illustrated, two parallel skeleton or truss beams have been disclosed. For the purpose of stiffening the casing relative to the carrying beam, it is not necessary to provide special means. Instead, the usual partition plates 9 provided for dividing a tank into non-communicating compartments can be used and these partitions, which are rigidly joined to the beam, can be welded or otherwise secured and tightly fastened to the casing without the use of reinforcing angle strips or the like. The points of attachments have been indicated at 10.

The only places where structural stiffening or supporting means are employed in addition to the beam or beams 8 is between the end portions of the beam or beams and the respective bottom plates 4 and 5. Added angle strips for this purpose have been indicated at 11 between bottom plate 5 and the rear end portion of the beam or beams 8 and transverse channeled plates 12 have also been indicated between the bottom plate 4 and the front portion of the beam or beams 8. Thus the weight of the load can be transmitted properly from the ends of the beam or beams to the supporting tractor and to the rear wheels.

At other points within the casing 1, suitable partitions can be provided for separating the interior of the casing into separate compartments, some of these added partitions being indicated at 13 and 14. It is to be understood, however, that the partitions can be made very light so as not to add materially to the weight of the completed tank.

An important feature of this invention is that the beam or beams 8 act in effect as a pulling member connected between the prow and rear axle, thereby absorbing all of the pulling or pushing forces which exist when forward or rearward motion is applied to the prow and eliminating any pulling or pushing strains or stresses in the casing portion 1 of the tank which would normally cause fractures and leaks.

What is claimed is:

A portable tank mountable on wheel supported structures, comprising a casing having the bottoms of its end portions respectively disposed in planes above the plane of the bottom of its intermediate portion, and a frame from which the casing is suspended, the frame including a pair of spaced beams extended within and from end to end of the upper portion of the casing, the bottoms of the end and intermediate portions of the casing being spaced from the beam, the top of the casing being supported by the beam, said frame additionally including substantially vertically disposed supporting elements disposed above the wheel supported structures, and extending between the ends of the beam and the bottoms of the end portions of the casing, whereby to transmit in a substantially vertical direction the weight of the beam and its load to the wheel supported structures, and a plurality of transverse partition plates formed to the cross sectional contour of the casing and through which the beams are extended, said beams being connected to the plates to rigidify the plates and the casing being connected to the marginal portions of the plates, said pair of beams, supporting elements, and partition plates constituting the entire supporting and stiffening frame for the casing.

CARROLL B. FULTON.

REFERENCES CITED

The following references are of record in the file of this patent:

UNITED STATES PATENTS

| Number | Name | Date |
|---|---|---|
| 814,880 | Small et al. | Mar. 13, 1906 |
| 2,011,161 | Robinson, Sr. | Aug. 13, 1935 |
| 2,036,607 | Robinson | Apr. 7, 1936 |
| 2,054,706 | Morley | Sept. 15, 1936 |
| 2,358,190 | Theriault | Sept. 12, 1944 |